United States Patent [19]

Hogan

[11] Patent Number: 4,822,055

[45] Date of Patent: Apr. 18, 1989

[54] UNITIZED BEARING SEAL ASSEMBLY

[75] Inventor: Martin J. Hogan, Sandusky, Ohio

[73] Assignee: General Motors Corporation, Detroit, Mich.

[21] Appl. No.: 194,773

[22] Filed: May 17, 1988

[51] Int. Cl.⁴ .............................................. F16J 15/34
[52] U.S. Cl. .................................... 277/27; 277/50; 277/84; 277/152
[58] Field of Search .................... 277/84, 82, 152, 39, 277/153, 134, 50, 95, 133, 166, 37, 47, 81 R, 92, 27, 65

[56] References Cited

U.S. PATENT DOCUMENTS

| | | | |
|---|---|---|---|
| 3,254,898 | 6/1966 | Herbenar et al. | 277/47 |
| 3,362,719 | 1/1968 | McCormick | 277/37 |
| 3,667,767 | 6/1972 | Bakewell | 277/133 |
| 4,037,849 | 7/1977 | Thumm | 277/37 |
| 4,042,248 | 8/1977 | Williamitis | 277/134 |
| 4,399,998 | 8/1983 | Otto | 277/153 |
| 4,440,401 | 4/1984 | Olschewski et al. | 277/82 |
| 4,497,495 | 2/1985 | Christiansen | 277/50 |
| 4,770,425 | 9/1988 | Colanzi et al. | 277/153 |

Primary Examiner—William A. Cuchlinski, Jr.
Assistant Examiner—Peter Arsenovic
Attorney, Agent, or Firm—Patrick M. Griffin

[57] ABSTRACT

A unitized bearing seal includes a retention ring with a conical surface that prevents the casings of the seal from being pulled apart as well as cooperating with a flexible conical sealing wall to prevent lubricant loss without increasing seal torque significantly.

3 Claims, 1 Drawing Sheet

UNITIZED BEARING SEAL ASSEMBLY

This invention relates to automotive wheel bearing seals in general, and specifically to an improved unitized wheel bearing seal assembly.

BACKGROUND OF THE INVENTION

Wheel bearing seals used between an automotive wheel hub and shaft to retain and protect a lubricant supply from the ambient are generally garter spring seals. The typical garter spring seal includes a metal case that is press fitted into a bore in the hub, with an elastomer seal molded to the case has a seal lip that directly contacts the outer surface of the shaft. A garter spring surrounding the lip maintains its sealing force on the shaft and compensates for irregularities in and wear of the shaft surface.

Although they provide an effective seal, sprung seals create a great deal of rubbing friction, generally referred to as seal torque. A response to the high seal torque problem is disclosed in U.S. Pat. No. 4,497,495, assigned to the assignee of the present invention. The general type of seal disclosed there is known as unitized seal assembly. A unitized seal assembly has a pair of metal casings, one that press fits to each of the two bearing members. One of the casings provides the seal contact surface, rather than the outside of the shaft. Ideally, the two casings are retained together as a unit before installation for easy handling. A unitized seal assembly may also use a garter spring, which, of course, would still involve high seal torque. However, the seal in the above patent reduces seal torque very significantly by using a pair of unsprung seal lips molded to one casing which make a closely controlled, relatively light sealing contact with the other casing. The seal lips are stationary, so as to avoid centrifugal effects, and are oriented in such a way as to actually allow pressurized lubricant to exit, while preventing the ingress of contaminants. While it has proved highly successful, such a seal would not be practical in an environment where the anticipated pressure or other conditions could cause the loss of significant amounts of lubricant. There is, therefore, a need for a unitized seal assembly of comparably low seal torque that also has a better capacity to prevent the loss of significant amounts of lubricant in such an environment.

SUMMARY OF THE INVENTION

The invention provides an improved unitized seal assembly of the general type shown in the patent described above, but which also incorporates new structure that cooperates to unitize the assembly as well as better preventing the egress of lubricant without a great increase in seal torque.

The seal assembly of the invention is installed in the annular space between a cylindrical bore in a automotive wheel hub and a rotating shaft. A lubricant supply in a space is subject to being driven out and to ambient by heated and pressurized air in the same space. In the preferred embodiment, the invention includes two metal seal casings, the first of which press fits into the bore and the second of which press fits over the shaft. An elastomer seal on the first casing includes a conical sealing wall that extends generally diagonally from an inner to an outer lip, radially outwardly and axially toward the lubricant supply. The sealing wall is molded to the first casing at a hinge intermediate its two lips so as to be flexible in see saw fashion about the hinge. When the two casings are axially and radially aligned, the seal inner lip bears on a sleeve of the the second casing, while the outer lip overlies the inner edge of the the second casing sleeve. An annular plastic retention ring sized so as to fit tightly over the inner edge of the second casing sleeve has a conical surface that extends in the same direction as the seal wall. When the retention ring is added, its conical surface and the outer surface of the seal wall face each other in spaced, parallel fashion. In addition, in the embodiment disclosed, the retention ring is molded with an upstanding circular ridge which lies just beneath the hinge of the seal.

Prior to installation, the radial overlap of the retention ring and the seal wall, which may engage one another, maintains the two casings together as a unit assembly. After installation, when the two casings are maintained in alignment by the bearing members, the seal wall and retention ring are normally maintained spaced from one another, although the ridge lies close to the outer surface of the seal wall. Therefore, as the shaft rotates, seal torque is normally created only by the light contact of the inner seal lip with the second casing sleeve, which is the primary barrier to lubricant loss. Any lubricant that does migrate from the lubricant supply toward the inner lip will have to move first past the conical surface of the the retention ring, which is spinning with the shaft. Consequently, it will tend to be flung thereby radially outwardly and axially back into the lubricant supply space. Furthermore, pressure in the lubricant space, acting on the back of the seal wall, will tend to flex it about the hinge and toward the conical surface of the retention ring, creating a space that converges moving toward the lubricant supply. This will tend to move any lubricant entering that space back by capillary action, in addition to the slinging action. Should the pressure rise higher, the outer lip will flex farther in, finally engaging the conical surface tightly to create an even stronger primary barrier to lubricant egress. While this alone would increase seal torque significantly, the seal wall will simultaneously engage the ridge, which will tend to lever the inner lip up and decrease its seal torque. Therefore, lubricant loss is strongly prevented when needed without a great increase in seal torque.

It is, therefore, an object of the invention to provide a unitized seal assembly that better prevents the egress of lubricant without a large increase in seal torque.

It is another object of the invention to provide such a seal assembly in which a retention ring that is fitted to one seal casing overlaps a seal wall on the other casing to retain them together before installation while a conical surface on the retention ring provides a slinging action to return lubricant after installation.

It is another object of the invention to provide a flexible conical seal wall on the one casing with a conical surface that faces the conical surface of the retention ring in spaced, parallel fashion with an inner seal lip that engages the other seal casing and an outer seal lip that overlies the retention ring surface, so as to provide a primary barrier to lubricant loss with low seal torque, and so that flexing of the seal toward the retention ring surface can create a converging space that will return lubricant by capillary action.

It is still another object of the invention to provide the retention ring with a ridge that can engage the seal wall when the pressure is great enough to flex the outer lip into the retention ring surface, thereby providing a new primary barrier to lubricant loss, while levering the inner seal up to prevent a large increase in seal torque.

DESCRIPTION OF THE PREFERRED EMBODIMENT

These and other objects and features of the invention will appear from the following written description, and from the drawings, in which.

Figure 3:
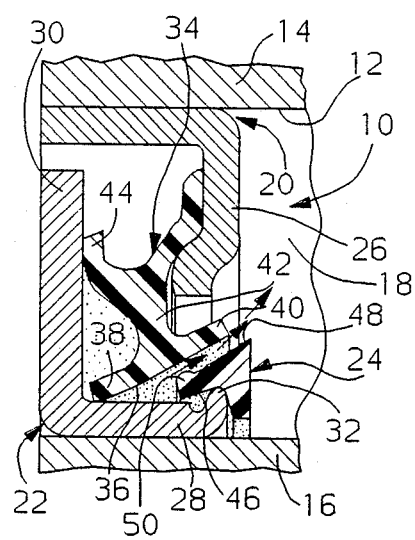
FIG. 3 is a view of the assembly after installation, at low or normal pressure.

Referring first to FIG. 3, the preferred embodiment of the seal assembly of the invention, indicated generally at 10, is installed in the annular space formed between a cylindrical bore 12 in a stationary wheel hub 14 and the outside of a rotatable shaft 16. A lubricant supply in the space 18 on the right side of seal 10 must be protected both against loss and against contaminants from the ambient on the left. Space 18 contains air as well as lubricant, and, in certain applications, that air may be heated and pressurized due to the proximity of brakes, or for other reasons. That pressure, in turn, can tend to drive the lubricant out. Seal assembly 10 is designed to prevent that, while keeping seal torque low.

Figure 1:
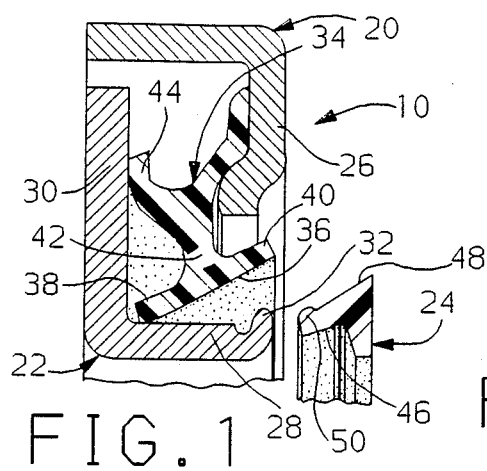
FIG. 1 is a view of the two seal casings aligned before installation, and before the retention ring is added.

Referring next to FIG. 1, seal assembly 10 includes two stamped steel seal casings of a generally L-shaped cross section, an outer casing 20 and an inner casing 22, and a molded plastic annular retention ring 24. Outer casing 20 is sized to press fit into bore 12, and has a depending annular flange 26 that extends about half way across the annular space between bore 12 and shaft 16. Inner casing 22 has a sleeve 28 sized to press fit over shaft 16 with an upstanding annular flange 30 at its the outer edge and an upturned inner edge 32. An elastomer seal designated generally at 34 is molded to outer casing 20 at flange 26. Seal 34 has a conical sealing wall 36 that extends generally diagonally, that is, radially outwardly and axially inwardly to the left, within the annular space between bore 12 and shaft 16. Wall 36 is molded to flange 26 intermediate an inner lip 38 and an outer lip 40 at a generally T shaped hinge 42. As such, wall 36 can flex about hinge 42 in see saw fashion, with inner lip 38 moving out as outer lip 40 moves in, and vice versa. When the two casings 20 and 22 are moved into axial and radial alignment as shown, the seal inner lip 38 flexes past edge 32 and bears lightly on the inner casing sleeve 28. The outer seal lip 40 overlies the inner edge 32 of sleeve 28. In the particular embodiment disclosed, seal 34 also has a secondary lip 44 that makes a light sealing pressure with the inside of inner casing flange 30, to provide an additional barrier to contaminant entry.

Figure 2:
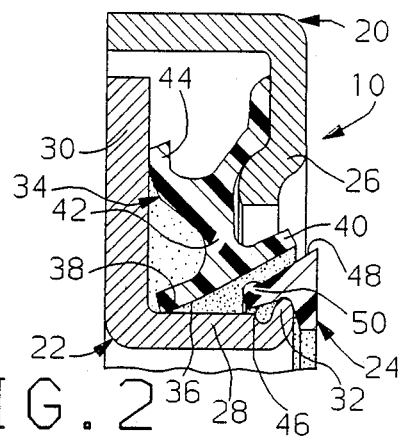
FIG. 2 is a view like FIG. 1, after the retention ring has been added.

Referring next to FIGS. 1 and 2, retention ring 24, which is molded of a partially resilient plastic, has a radially inwardly facing notch 46 on its inner diameter sized so as to make a secure snap fit with inner casing edge 32. Opposite notch 46 is an outwardly facing conical surface 48 that extends in the same direction as seal wall 36. Molded to the inner edge of surface 48 is an upstanding circular ridge 50. Given the shortness of upturned inner edge 32 and the flexibility of wall 36, their overlap, as seen in FIG. 1, is not sufficient to prevent the casings 20 and 22 from being pulled apart. However, retention ring 24 is not nearly as flexible as seal wall 36, so it makes a tight snap fit with edge 32, as seen in FIG. 2. After retention ring 24 is added, there is sufficient radial overlap of its conical surface 48 with the seal wall 36 to prevent pull apart. Prior to installation of seal assembly 34, the conical surface 48 of retention ring 24 may bump against the outside of seal wall 36, but there will be no effect on the seal.

Referring next to FIG. 3, seal assembly 10 is shown after installation, and at low or normal pressure conditions. The casings 20 and 22 will be maintained in rigorous alignment by their press fit with the coaxial bore 12 and shaft 16. Consequently, the inwardly facing outer surface of the conical sealing wall 36 and the outwardly facing conical surface 48 of the retention ring 24 will be spaced apart in parallel fashion, without touching or bumping. The ridge 50, which rests beneath the hinge 42, is closer to wall 36, but still does not touch. Thus, seal torque will come only from the light engagement of the seal lips 38 and 44 with the inner casing 22. While retention ring 24 no longer serves a retention purpose after seal assembly 10 is installed, it acts in several ways to help prevent lubricant loss. Even under the low pressure conditions shown in FIG. 3, lubricant may migrate into the space between retention ring 24 and seal wall 36. While inner seal lip 38 provides the primary barrier against lubricant loss, retention ring 24 provides an assist. Since inner casing 22 turns with shaft 16, retention ring 24 does as well. Given the orientation and spinning of retention ring conical surface 48, such migrating lubricant will be thrown centrifugally back toward the lubricant space 18, as shown by the arrows.

Figure 4:
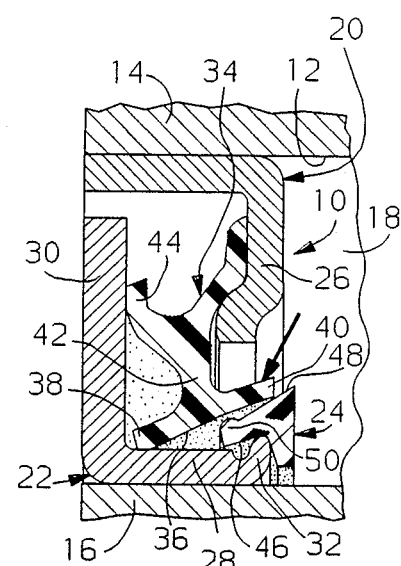
FIG. 4 is a view like FIG. 4, showing the effect on the seal of moderate pressure.
Figure 5:
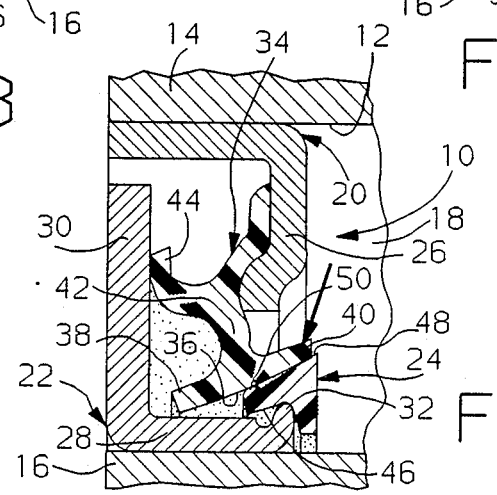
FIG. 5 is a view showing the effect on the seal of higher pressure.

Referring next to FIGS. 4 and 5, when the air in space 18 is sufficiently heated and pressurized to drive lubricant toward ambient more strongly, the retention ring 24 cooperates with the sealing wall 36 in other ways to assist in preventing lubricant loss. As seen in FIG. 4, which shows a moderate pressure condition, pressure acting on the back of the seal wall 36, represented by the arrow, will tend to flex it about the hinge 42, moving outer seal lip 40 toward the conical surface 48. This creates a space that converges toward the lubricant space 18. Thus, lubricant entering the converging space will be moved back by capillary action, in addition to the centrifugal slinging action described above. Should the pressure rise higher, as shown in FIG. 5, seal wall 36 will flex even farther about hinge 42 to the point where outer seal lip 40 contacts the conical surface 48 tightly. While this will create an even stronger primary barrier to the egress of lubricant from space 18, it will increase seal torque as well, in the absence of any other mechanism. However, the greater inward flexing of seal wall 36 brings its outer surface into contact with the ridge 50. This tends to simultaneously to lever the inner lip 38 upward from sleeve 28, or at least lessen the force of its contact with sleeve 28, decreasing the rubbing friction. Therefore, the cooperation of retention ring 24 with the seal wall 36 automatically provides an increasing resistance to lubricant loss exactly when needed, but without creating a great increase in seal torque.

Variations in the preferred embodiment disclosed may be made. If the pressure in space 18 was not significant, wall 36 would not need to flex as described. However, retention ring 24 could still overlap the retention ring 24 to prevent casing pull apart, and its conical surface 48 could still provide the slinging action described. If the seal casing to which retention ring 24 was fitted was pressed into the stationary bearing member, it would not provide the slinging action, although its conical surface 48 could still cooperate with the seal wall 36 as it flexed under pressure. If ridge 50 were eliminated, retention ring 24 would provide all the described advantages except for levering up the inner sealing lip 38. Notch 46 and upturned edge 32 provide a secure method of holding retention ring 24 to inner casing 22, but a tight press fit per se could be used as well. The ridge 50 need not be a continuous ridge, but could be molded as a series of bumps or projections. The secondary lip 44 and flange 30, of course, do not cooperate in the invention, but do provide a convenient first line of defense against the entry of contaminants from the ambient. Therefore, it will be understood that the invention is not intended to be limited to just the preferred embodiment disclosed.

The embodiments of the invention in which an exclusive property or privilege is claimed are defined as follows:

1. A unitized seal assembly for use in the annular space formed between a stationary bearing member and a rotating bearing member extending coaxially through said core, with a supply of lubricant being located on one axial side of said annular space and ambient on the on the other axial side of said annular space, said seal assembly comprising, a first casing sized so as to fit within the bore of said stationary bearing member, a second casing having a sleeve sized so as to fit over said rotating bearing member, an elastomer seal bonded to said first casing with a radially inner sealing lip that sealingly engages said second casing sleeve, and, a generally annular retention ring sized to fit tightly to said second casing, said ring further having an outwardly facing conical surface that extends axially toward said lubricant space and radially outwardly sufficiently far to radially overlap said elastomer seal, whereby said seal assembly may be assembled by axially aligning said first and second casings and then fitting said retention ring to said second casing, after which the radial overlap of said retention ring conical surface and said seal prevents said casings from being pulled apart, said retention ring conical surface also acting, after said casings have been installed, to throw any lubricant moving axially toward ambient radially outwardly and axially back into said lubricant supply as said second casing rotates with said rotating bearing member.

2. A unitized seal assembly for use in the annular space formed between a bore in one bearing member and another bearing member extending coaxially through said bore, with ambient located on one axial side of said annular space and a supply of lubricant that is subjected to pressure located on the other axial side of said annular space, said seal assembly comprising, a first casing sized so as to fit within the bore of said one bearing member, a second casing having a sleeve sized so as to fit over said other bearing member, an elastomer seal including a conical wall extending radially outwardly and axially toward said lubricant side from an inner to an outer lip and bonded to said first casing at a hinge intermediate said inner and outer lips so as to be flexible about said hinge, said inner lip being sealingly engageable with said second casing sleeve, and, a generally annular retention ring sized to fit tightly to said second casing, said ring further having a conical surface that rests generally parallel to and closely spaced from the outside of said seal conical wall, whereby said seal assembly may be assembled by axially aligning said first and second casings and then fitting said retention ring to said second casing, after which the radial overlap of said seal wall and retention ring prevents said casings from being pulled apart, with said seal conical wall flexing toward said retention ring conical surface under pressure to form a converging space to force lubricant entering said converging space back into said lubricant supply under capillary action.

3. A unitized seal assembly for use in the annular space formed between a bore in a stationary bearing member and a rotatable bearing member extending coaxially through said bore, with ambient located on one axial side of said annular space and a supply of lubricant that is subjected to pressure located on the other axial side of said annular space, said seal assembly comprising, a first casing sized so as to fit within the bore of said stationary bearing member, a second casing having a sleeve sized so as to fit over said rotating bearing member, an elastomer seal including a conical wall extending radially outwardly and axially toward said lubricant side from an inner to an outer lip and bonded to said first casing at a hinge intermediate said inner and outer lips so as to be flexible about said hinge, said inner lip being sealingly engageable with said second casing sleeve, and, a generally annular retention ring sized so as to fit tightly to second casing, said ring further having a conical surface that rests generally parallel to and spaced from the outside of said seal conical wall with an upstanding ridge closely spaced from said seal conical wall and proximate said hinge, whereby said seal assembly may be assembled by axially aligning said first and second casings and then fitting said retention ring to said second casing, after which the radial overlap of said seal wall and retention ring prevents said casings from being pulled apart, with said seal conical wall flexing toward said retention ring conical surface under pressure so as to engage said outer seal lip with said conical surface to create a new barrier to lubricant loss while said seal wall concurrently engages said ridge to lever said inner seal lip away from said sleeve.

* * * * *